United States Patent [19]

Wirth

[11] 3,990,049
[45] Nov. 2, 1976

[54] SELECTIVE DATA SEGMENT MONITORING SYSTEM

[75] Inventor: Manfred N. Wirth, Sunnyvale, Calif.

[73] Assignee: The United States of America as represented by the Administrator of the National Aeronautics and Space Administration, Washington, D.C.

[22] Filed: May 12, 1975

[21] Appl. No.: 576,774

[52] U.S. Cl. .................. 340/172.5; 178/69.5 R; 179/15 BS
[51] Int. Cl.² ........................................ G06F 3/00
[58] Field of Search ............ 340/172.5; 178/69.5 F, 178/69.5 R; 179/15 BS; 325/325; 307/269

[56] References Cited
UNITED STATES PATENTS

| | | | |
|---|---|---|---|
| 3,266,024 | 8/1966 | Kersey et al. | 340/172.5 |
| 3,543,247 | 11/1970 | Schrem | 340/172.5 |
| 3,576,396 | 4/1971 | Sloate | 178/69.5 F |
| 3,668,645 | 6/1972 | Reymond et al. | 340/172.5 |
| 3,754,217 | 8/1973 | Bell et al. | 340/172.5 |
| 3,764,987 | 10/1973 | Schulze | 340/172.5 |
| 3,778,778 | 12/1973 | Ragen | 340/172.5 |

*Primary Examiner*—Gareth D. Shaw
*Assistant Examiner*—Melvin B. Chapnick
*Attorney, Agent, or Firm*—Darrell G. Brekke; Gary F. Grafel; John R. Manning

[57] ABSTRACT

High speed data monitoring apparatus for displaying the bit pattern of a selected portion of a block of transmitted data comprising a shift register for receiving the transmitted data and for temporarily containing the consecutive data bits therein, a programmable sync detector for monitoring the contents of the shift register and for generating a sync signal when the shift register contains a predetermined sync code, a counter for counting the data bits input to the shift register after the sync signal is generated and for generating a count complete signal when a selected number of data bits have been input to the register, a data storage device for storing the contents of the shift register at the time the count complete signal is generated, and a display for displaying the segment of data stored in the storage device.

10 Claims, 4 Drawing Figures

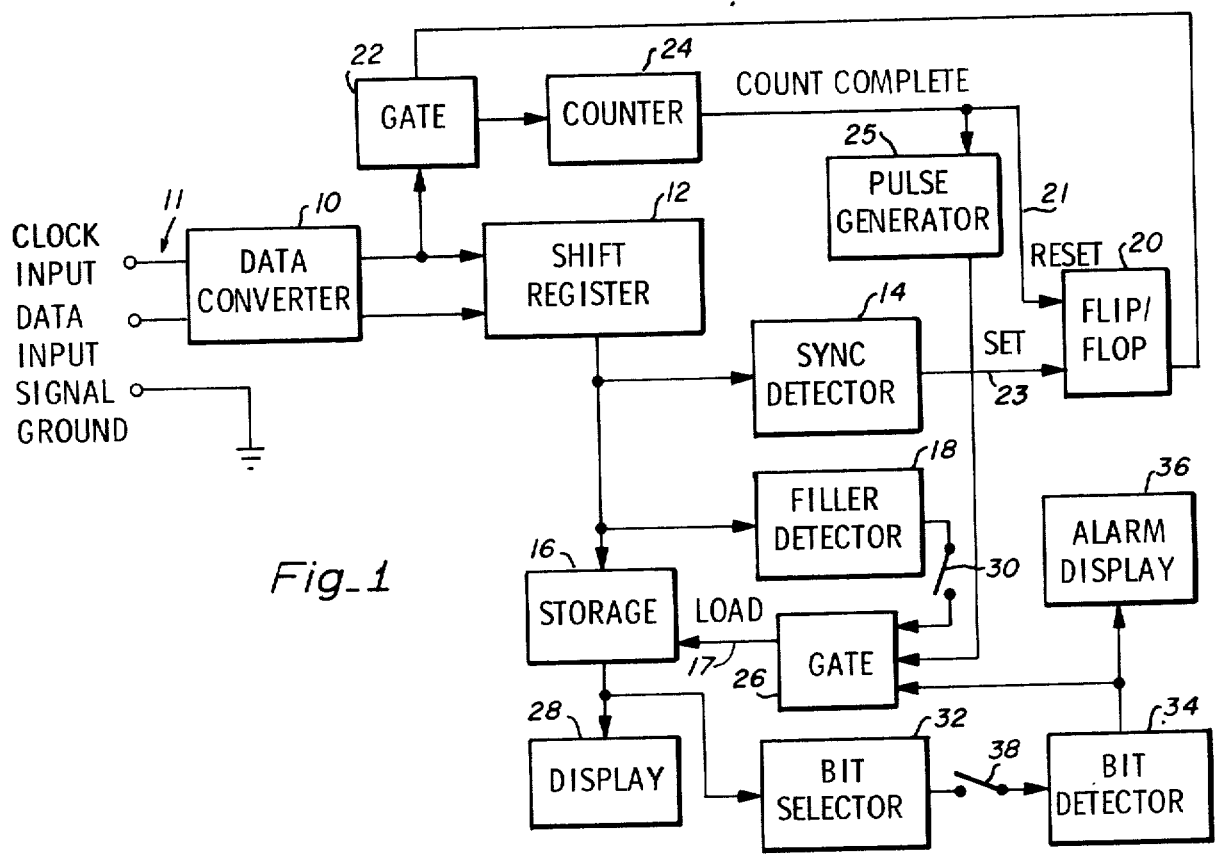
Fig_1
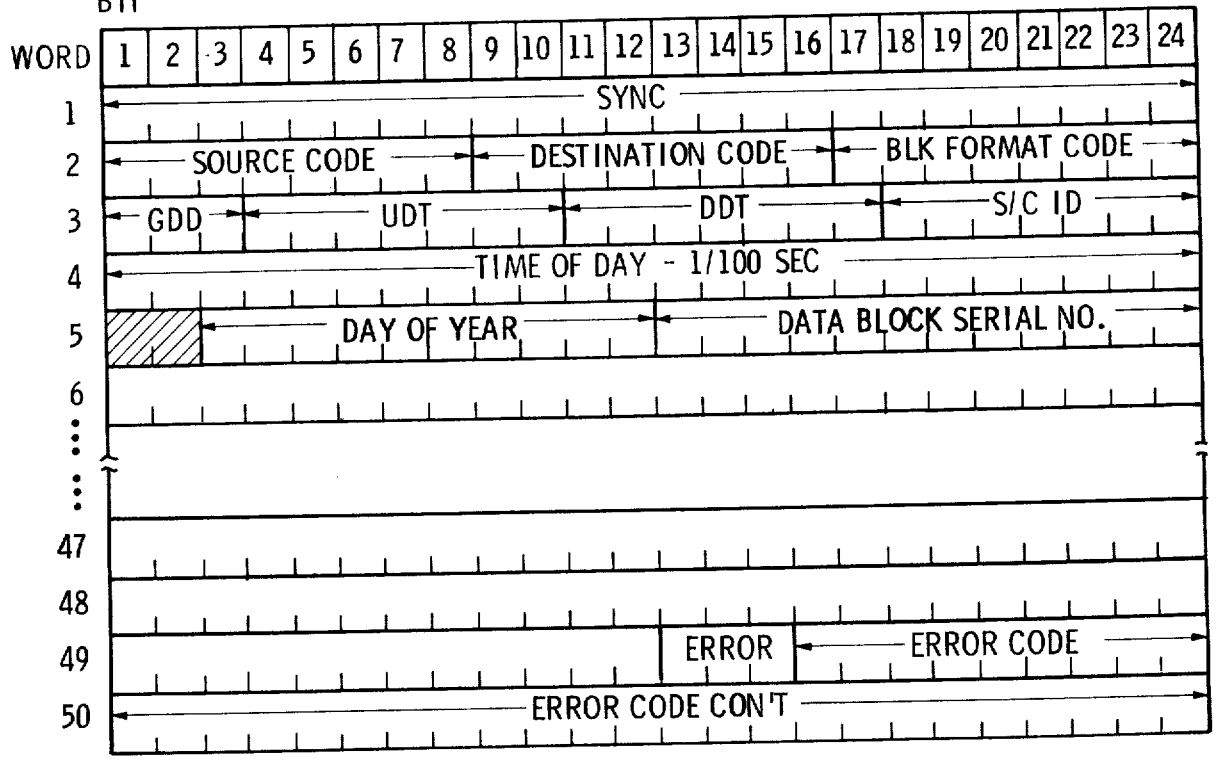
Fig_2

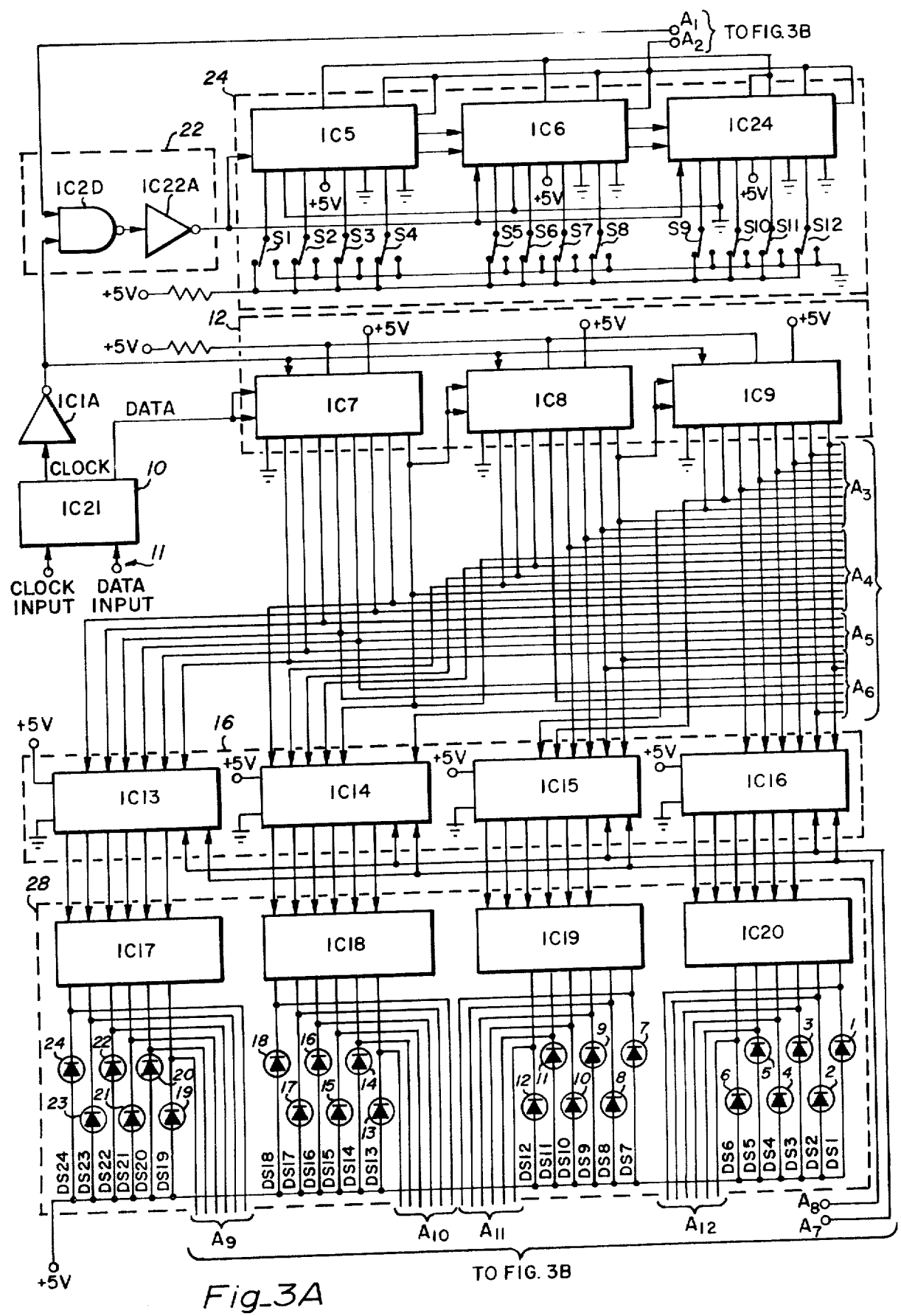
Fig_3A

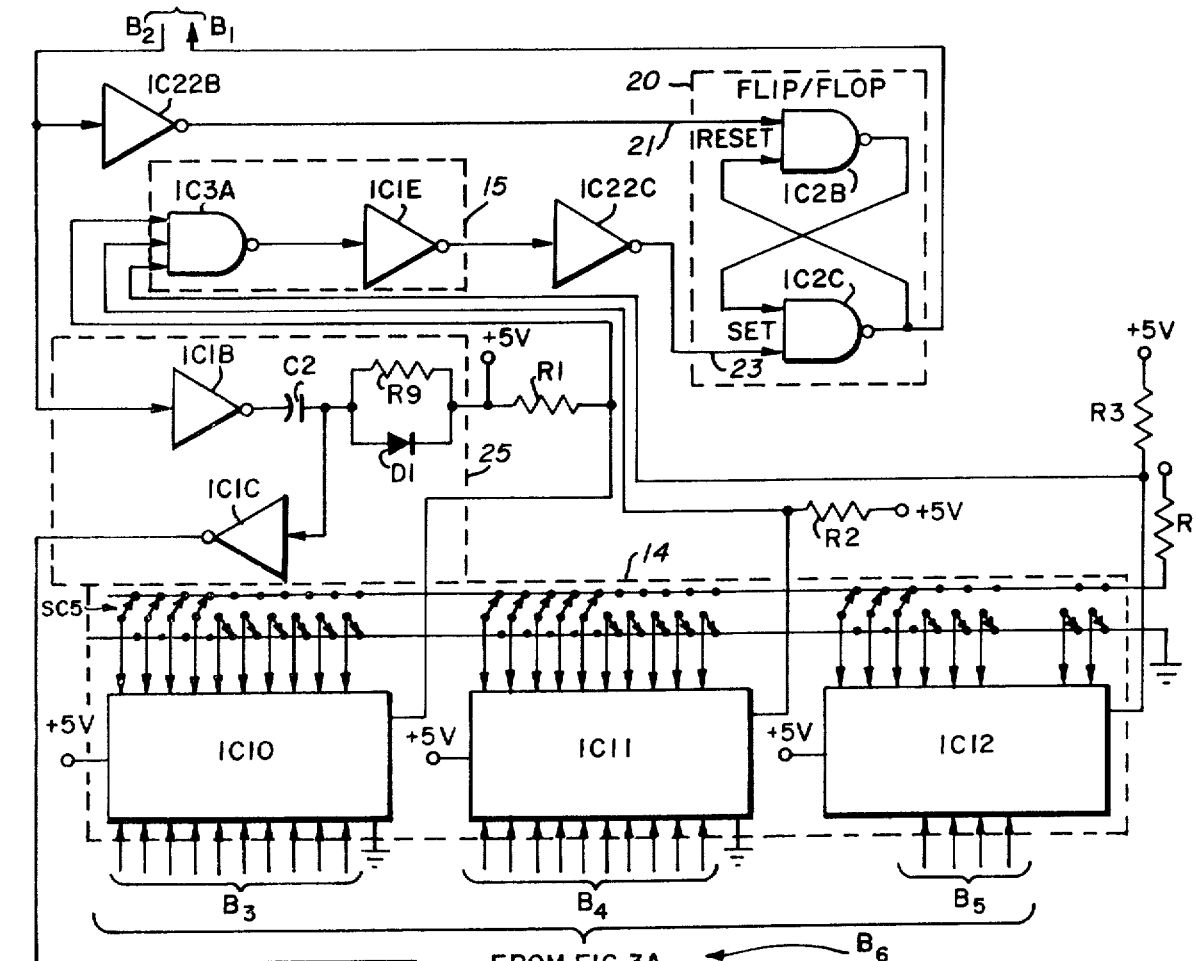
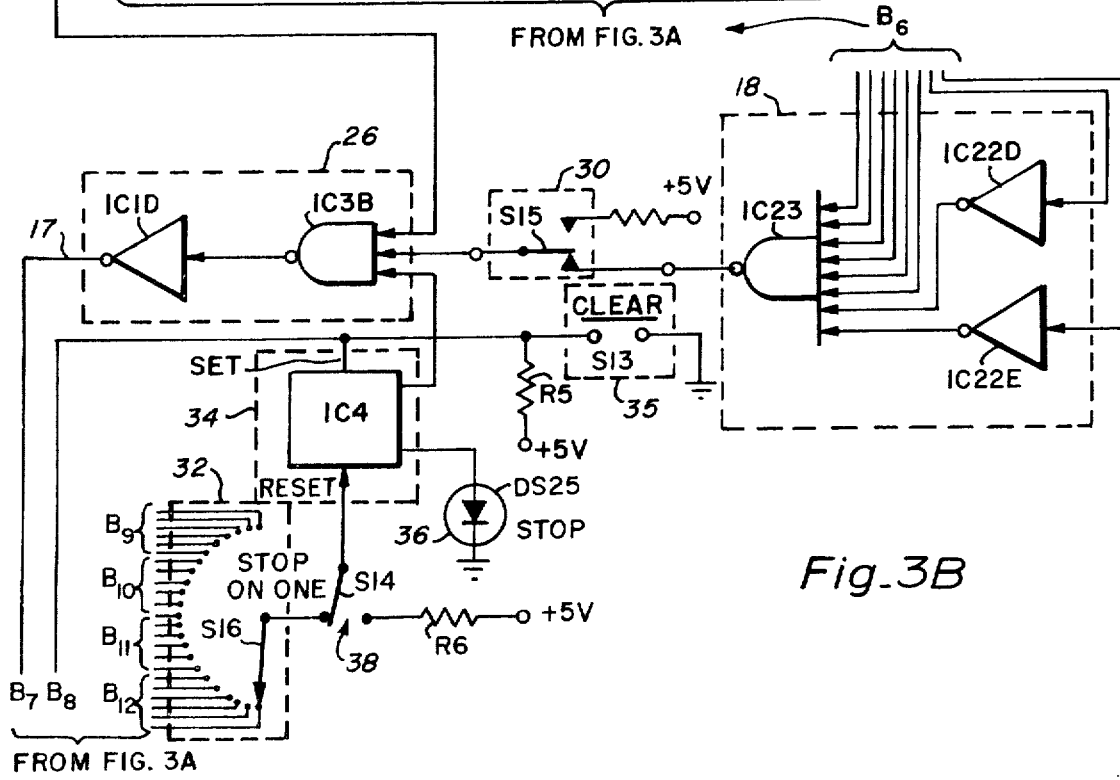
Fig. 3B

SELECTIVE DATA SEGMENT MONITORING SYSTEM

The invention described herein was made by an employee of the United States Government, and may be manufactured and used by or for the government for governmental purposes without payment of any royalties thereon or therefor.

BACKGROUND OF THE INVENTION

1. Field of the Invention

The present invention relates generally to transmitted data monitoring apparatus, and more particularly, to a high speed data monitor capable of displaying a particular segment of data selected from a transmitted block of data.

2. Description of the Prior Art

Digital data transmission via data modems usually is in the form of fixed-length blocks of data which also contain a synchronization code and various other information such as source codes, destination codes, serial numbers, error codes, etc., in addition to the actual data. If the input data for a particular data block is insufficient to fill that data block, such as where, for example, the input data rate is lower than the transmission rate, filler data of a defined pattern is inserted to complete the data block. Should an error occur in the transmission, it is likely that the receiving equipment will not be able to interpret the data and perform the intended operation. For example, the transmission source, normally a computer, may make errors which would cause a misinterpretation of the received data; a programming error may result in the generation of erroneous identification codes; a telephone line connection error may result in informaation being addressed to the wrong terminal; or faults may occur in the transmitting or receiving equipment. In any case, when the receiving terminal equipment fails to process the received data, the cause for the failure must be determined.

Heretofore, in order to locate and identify data errors, either special computer programs were used to print the received data, or a general purpose oscilloscope was used to display the received bit pattern. However, the use of special computer programs is extremely impractical since considerable cost is involved in writing the special programs, the execution of the special program prevents the execution of regular processing programs, and a dedicated computer must be allocated for diagnosing the suspected data transmission problem. Moreover, where the received data rate exceeds the speed of the computer printer not all data can be printed, the interpretation of large volumes of printed data is difficult and time consuming, and where the problem is caused by the computer itself, the computer's program or interfacing equipment, no data printout will be obtained.

Another problem is that no capability is usually provided for monitoring the received data stream simultaneously with the normal processing of the data received.

Furthermore, the use of a oscilloscope as a means of inspecting the transmitted data is severely limited by the requirements for a external trigger source synchronous with the received data block. Although certain types of receiving equipment are capable of generating a suitable trigger signal, even in those devices the delayed sweep feature of the oscilloscope will have to be adjusted by trial and error to bring the desired data segment into view. Perhaps the most important disadvantage of using the oscilloscope method is that it is nearly impossible to assure that the data segment being viewed on the oscilloscope is in fact the data segment of interest.

SUMMARY OF THE PRESENT INVENTION

It is therefore an object of the present invention to provide a data monitoring apparatus which can be used to diagnose or routinely monitor a data transmission operation without interfering with the normal operation of the monitored system.

Another object of the present invention is to provide a high speed data monitor capable of selecting and displaying a particular data segment from a particular block of transmitted data.

Still another object of the present invention is to provide a high speed data monitor having built-in flexibility which permits its use with a variety of transmission systems even though they may have differing transmission rates, data formats and codes.

Briefly, a preferred embodiment of the present invention includes a shift register for receiving and storing input data, a programmable sync detector for monitoring the contents of the shift register and for generating a sync signal when the contents of the shift register contain a predetermined sync code, a counter for counting the data bits input to the register after the sync signal is generated and for generating a COUNT COMPLETE signal when a selectively predetermined number of data bits have been input to the register, a data storage device for storing the contents of the shift register at the time the COUNT COMPLETE signal is generated, and a display means for displaying the selected segment of data stored in the storage device. The apparatus also includes an optional means for inspecting a specific bit within the selected segment of data each time the segment is monitored. An additional optional feature is also provided for determining whether or not the data stored in the shift register is filler data, and if so, for preventing the contents of the shift register from being stored and displayed.

An important advantage of the present invention is that it can be used to monitor transmitted data without interfering with the operation of the transmission system.

Another advantage of the present invention is that it allows a specific data segment of a data block to be monitored and displayed without interfering with the normal processing of the data.

Still another advantage of the present invention is that it can selectively monitor a specific data bit within the selected data segment and interrupt the monitoring operation when an error bit is detected.

Still other objects, features and advantages of the present invention will no doubt become apparent to those skilled in the art after having read the following detailed description of the preferred embodiment which is illustrated in the several figures of the drawing.

IN THE DRAWINGS

FIG. 1 is a block diagram generally illustrating the principal components of a data monitor in accordance with the present invention;

FIG. 2 is a diagram illustrating a generalized data block format of a type which may be monitored in accordance with the present invention;

FIGS. 3A and 3B are matching detailed parts of a more detailed block diagram further illustrating the preferred embodiment shown in FIG. 1.

DESCRIPTION OF THE PREFERRED EMBODIMENT

FIG. 1 is a block diagram generally illustrating the principal components of a high speed data monitor in accordance with the present invention. The monitor includes a data converter 10 having a pair of input terminals 11 which may be coupled to any apparatus handling the data stream to be monitored, i.e., the transmitter, the transmission link, or the receiver. Converter 10 converts the bipolar binary data and associated clock signals in the data stream into corresponding unipolar standard digital logic signals which are then coupled into a shift register 12. The contents of shift register 12 are applied to a sync detector 14 which is, in essence, a programmable comparator programmed to generate an output when a particular series of sync data appears in register 12. The data in shift register 12 is also coupled to the input terminals of a storage medium 16 which typically consists of a plurality of electronic storage latches which may be activated by a LOAD signal applied at 17. As will be explained in more detail below, a portion of the contents of shift register 12 is also input to a "filler" detector 18.

As indicated above, detector 14 is programmed with a particular synchronization code which, in the preferred embodiment, forms the first 24 bits of the block of data received. By way of example, a typical data block format is illustrated in FIG. 2 of the drawing. When the data input to shift register 12 contains the particular sync code programmed into detector 14, coincidence is obtained and detector 14 develops an output which sets a flip-flop 20. The output of flip-flop 20 is then applied to a gate 22 which gates the input clock pulses into a counter 24 which is adjusted to count up to a predetermined count corresponding to a particular portion of the data stream which has been selected to be monitored. When the desired count is reached, an output signal (a COUNT COMPLETE signal) is generated which resets flip-flop 20 and thereby inhibits gate 22 to stop any further clock pulses from being input into counter 24.

The COUNT COMPLETE signal is also input to a pulse generator 25 which develops a short duration pulse that is then input through a gate 26 to provide a pulse LOAD signal for causing storage means 16 to admit and store the data presently contained in shift register 12. A visual representation of the stored portion of the monitored data block is then displayed by a display means 28, which may include a plurality of solid state lamps or other suitable means, each corresponding to one of the bits of data in the portion to be monitored.

The preferred embodiment also includes two additional features which will be referred to as a "SUPPRESS FILLER DATA" feature and the "STOP-ON-ONE" feature. In order to maintain data transmission synchronization, the data terminal equipment generates pseudodata when no operational data is to be transmitted. The filler detector 18 is utilized to detect the presence of such data. Upon detection of such data in the contents of register 12, detector 18 will generate a signal which will inhibit gate 26 and prevent any subsequent COUNT COMPLETE signals from causing storage means 16 to store the filler data present in the register 12. This feature may be selectively incorporated in the apparatus by closure of the switching means 30.

The STOP-ON-ONE feature is a means which enables a particular bit of the selected data block portion to be further monitored so that in the event the particular bit has a predetermined logical state, the monitoring operation can be interrupted, the presently displayed data block portion can be continuously displayed and an annunciator means can be actuated to call attention to the error. This feature includes a bit selector 32 for selecting the particular bit to be monitored, a bit detector 34 for detecting a predetermined logical state of the particular bit, and an annunciator consisting of either a visual or audio alarm 36 which responds to the output of detector 34. The output of detector 34 is also used to inhibit gate 26 and prevent any subsequent COUNT COMPLETE signals from enabling the storage means 16.

The effect of such operation is to cause the data block portion then in storage 16 to be continuously displayed by display means 28 until some subsequent clearing operation is effected. The STOP-ON-ONE feature is rendered operational by the closure of a switching means 38.

Turning now to FIG. 2 of the drawing, a generalized data block format is illustrated which includes 50 24-bit words with the first 24-bit word comprising the synchronization code which, as indicated previously, is detected by sync detector 14 to initiate operation of the monitoring apparatus. The second 24-bit word includes source, destination and block format codes. The third word includes information concerning the gross data description (GDD), the user data type (UDT), the data dependent type (DDT) and the spacecraft identification (S/C ID). Words four and five provide time, date and data block serial number information. Words six through most of forty-nine are for data, and the remainder of word forty-nine and all of word fifty are used to convey error code information.

Turning now to FIGS. 3A and 3B, a more detailed schematic of the preferred embodiment shown in FIG. 1 is illustrated. The active circuit components are comprised of standard integrated circuit elements mostly of the TTL (Transistor-Transistor-Logic) variety. Suitable types are identified below in Table I. All of the Table I IC's are available from National Semiconductor Corporation, 2900 Semiconductor Drive, Santa Clara, California 95051. The LM 1489 is described in the National Semiconductor catalog entitled, "Linear Integrated Circuits." The remaining integrated circuits are described in National's "TTL Data Book." Each of the current-limiting resistors is a 1 kohm resistor.

TABLE I

| DESIGNATION | TYPE | DESIGNATION | TYPE | DESIGNATION | TYPE |
|---|---|---|---|---|---|
| IC1 | 7404 | IC9 | DM7570 | IC17 | DM7406 |
| IC2 | 7400 | IC10 | DM7130 | IC18 | DM7406 |
| IC3 | 7410 | IC11 | DM7130 | IC19 | DM7406 |
| IC4 | 7474 | IC12 | DM7160 | IC20 | DM7406 |
| IC5 | DM7520 | IC13 | DM74174 | IC21 | LM1489 |

TABLE I-continued

| DESIGNATION | TYPE | DESIGNATION | TYPE | DESIGNATION | TYPE |
|---|---|---|---|---|---|
| IC6 | DM7520 | IC14 | DM74174 | IC22 | 7404 |
| IC7 | DM7570 | IC15 | DM74174 | IC23 | 7430 |
| IC8 | DM7570 | IC16 | DM74174 | IC24 | 7520 |

More particularly, converter 10 is comprised of a single integrated circuit element IC21, shift register 12 is comprised of three 8-bit registers IC7, IC8, and IC9 connected in series, and sync detector 14 is comprised of three comparator circuits IC10, IC11 and IC12 with one set of the collective input terminals programmed to the synchronization code and the other set of inputs connected to the output lines of shift register 12. The output lines of comparator elements IC10, IC11 and IC12 are AND-ed by a gate 15 comprised of a NAND gate IC3A and an inverting amplifier IC1E, with the AND-ed output being coupled to the SET input of flip-flop 20 by an inverting amplifier IC22C.

Storage means 16 is comprised of four integrated circuit latches IC13, IC14, IC15 and IC16 of the types indicated with each having their respective data input leads connected to the output leads of shift register 12 and their data output leads connected to the respective input terminals of the lamp driver circuits IC17, IC18, IC19 and IC20 of display means 28. The LOAD enable inputs of the latch elements are commonly connected to the output of gate 26 by line 17. The driver circuits of display 28 each drive six of the 24 solid state lamps DS1-DS24, each of which indicates the logical state of one of the data bits of the 24-bit portion of the data block monitored.

Filler detector 18 is comprised of a pair of inverting amplifiers IC22D and IC22E, and a NAND gate IC23 has six of its inputs connected directly to certain output lines of register 12 and two of its inputs coupled to outputs of register 12 through the amplifier IC22D and IC22E as shown.

The output of NAND gate IC23 is connectable to one of the inputs to gate 26 through switching means 30 which is comprised of a mode select switch S15. Switch S15 is operable to connect one of the inputs of gate 26 to either a +5 volt bias potential (filler enable mode) or the output of detector 18 (filler suppress mode).

Flip-flop 20 is comprised of a pair of NAND gates IC2B and IC2C interconnected in standard logic configuration. The RESET input 21 is connected to the output of counter 24 by an inverting amplifier IC22B and the SET input 23 is coupled to the AND-ed output of sync detector 14 by inverting amplifier IC22C. The output of flip-flop 20 is fed to one of the inputs to gate 22, which is comprised of a NAND gate IC2D and an inverting amplifier IC22A, where it is AND-ed with the input clock pulses and enables such pulses to enter counter 24 when flip-flop 20 is in the SET condition.

Counter 24 is comprised of three integrated circuit counter elements IC5, IC6 and IC24 of the types indicated, and twelve switches S1-S12 connected to the counters as illustrated to enable selection of the particular end count desired. For example, by appropriate connections of the various switches S1-S12 to either the +5 volts bias line or the ground potential line, any data bit following the synchronization code can be selected to cause the adjacent 24 data bits to be displayed by display means 28. When the preselected count is reached, counter 24 develops the COUNT COMPLETE signal for resetting flip-flop 20 and for causing the data in register 12 to be stored and displayed. Pulse generator 25 is comprised of inverting amplifiers IC1B, IC1C, capacitor C2, resistor R9 and diode D1. It functions as a positive-edge, triggered, one-shot multivibrator generating a positive pulse of 0.5 millisecond duration when the input to inverting amplifier IC1B rises from ground potential to a positive level.

Gate 26 is a 3-input AND gate comprised of a NAND gate IC3B and an inverting amplifier IC1D. So long as the other two inputs are high, the pulse developed by generator 25 will pass directly to the control inputs of latches IC13-IC16 and cause them to accept and store the data in register 12.

In the illustrated preferred embodiment, bit selector 32 is comprised of a 24-position rotary switch S16, having its 24 fixed contacts connected in order to the energizing circuits of the lamps DS1-DS24 and its rotary contactor connected to switching means 38. Bit detector 34 is comprised of a flip-flop having its RESET input connected to switch 38, its SET input normally biased to +5 volts but connectable to ground by a clearing circuit 35, one of its outputs connected to gate 26, and its other output connected to the annunciator 36 which may take the form of a solid state lamp DS25. Switching circuit 35 comprises a normally-open, momentary switch S13 which is connected between ground and the SET input of IC4.

The circuit also includes a power supply (not shown) and various other minor circuit elements not discussed in detail because the reasons for their inclusion is believed obvious and apparent.

In operation, the switches S1-S12 are selectively positioned to select the particular portion of the data block to be examined. The terminals 11 are then connected to the apparatus to be monitored so that the bipolar binary data stream and the associated clock pulses are applied to converter 10 and are converted by IC21 to unipolar standard digital logic levels. The data stream is then applied to the serial connected shift register elements IC7, IC8 and IC9 of register 12 with the clock signal being used to perform the shifting function. The contents of shift register 12 are applied to the latches IC13, IC14, IC15 and IC16 forming storage means 16 and to the "compare inputs" of the programmed comparator circuits IC10, IC11 and IC12 which form sync detector 14. As indicated above, the comparator circuits are programmed by selectively connecting the sync code select switches SCS either to ground or to +5 volts. In the specific application illustrated, the synchronization code programmed into the comparators is the 24-bit octal code 30473047.

When shift register 12, and thus the compare inputs to the comparator circuits, contain the binary bit pattern represented by the octal code 30473047, coincidence is obtained in the comparator circuits and the ouput of each circuit becomes a logical "1" or is "true." These outputs are then logically AND-ed by AND gate 15 amplified and inverted by amplifier IC22C and then applied to the SET input of flip-flop 20. The output of flip-flop 20 is applied to gate 22 whereby it is AND-ed with the input clock pulses by gate 22 and has the effect of permitting the clock signals to pass to counter 24.

Counter 24 counts each input clock pulse until the predetermined count determined by the positions of switches S1-S12 is reached. When the desired count is reached, the COUNT COMPLETE signal is generated by the counter and is fed through inverting amplifier IC22B to reset flip-flop 20 which in turn inhibits gate 22, thus stopping any further clock pulses from advancing counter 24. Simultaneously, the COUNT COMPLETE signal is input to pulse generator 25 which in turn generates a short pulse (LOAD signal) which is applied through gate 26 to the latch circuits IC13, IC14, IC15 and IC16 of storage means 16 so as to permit them to accept the data present at that moment in shift register 12, this data comprising the bit pattern in shift register 12 at the time the COUNT COMPLETE signal was generated.

The data contained in storage means 16 is applied to the lamp driver circuits IC17, IC18, IC19 and IC20 of display means 28, which in turn cause various ones of the solid state lamps DS1-DS24 to be energized according to the "true" or "false" levels present at the corresponding outputs of storage means 16. A binary 1 or true bit will light a lamp whereas a binary 0 or false bit will extinguish the lamp. The pattern of lit and dark lamps thus presents a visual display of the bit pattern present in the shift register at the time the COUNT COMPLETE signal was generated. In other words, the lamps will display a visual analog of the 24-bit portion of the data stream occurring X number of bits following the synchronization code, where X may be any number up to 4094.

As previously mentioned, in order to maintain data transmission synchronization, the data terminal equipment generates pseudodata messages called "filler data" when no operational data is being transmitted. In accordance with the preferred embodiment of the present invention, the presence of the filler data in shift register 12 may be decoded by the filler detector 18 and be used to inhibit the generation of a LOAD signal by AND gate 26. This action thus prevents the storage of filler data in the storage means 16 and accordingly, no data display is made by display means 28. This mode of operation is selectable by means of the mode switch S15 which may be selectively switched between filler enble position and a filler suppress position as illustrated.

In the preferred embodiment the STOP-ON-ONE feature is provised by means of the rotary switch S16 which forms the bit selector 32. Switch S16 may be rotated to contact a lead extending to the drive circuit of any one of the display lamps DS1-DS24 so that the lamp drive current will flow through switch S16, the mode switch S14 and into the detector 34. If detector 34 senses an error event in the particular bit selected, it will cause the lamp DS25 to be lit and will simultaneously inhibit gate 26 so as to prevent insertion of new data into storage means 16 until the clear switch S13 is closed. For example, assume that a certain 24-bit section of the data block has been selected and that bit number 7 thereof contains an error code such that a logical 0 signifies no error and a logical 1 signifies an error event. Assume also that the error event may occur only once a day and it is important to analyze the condition under which the error occurred.

If the user switches mode selector switch 38 to the STOP-ON-ONE mode and sets switch S16 to bit 7, the display will continue to show the contents of the selected 24-bit segment each time that it is received so long as bit 7 remains a logical 0. However, should bit 7 change to a logical 1, flip-flop IC4 will be reset and cause lamp 36 to be lit and gate 26 to be inhibited. This inhibiting of gate 26 will prevent any further LOAD signals from enabling the storage means 16. In essence then, the status of the data when the error event occurred will be permanently frozen in display 28 until the clear switch S13 is depressed to clear the system and enable the monitoring operation to continue.

The STOP-ON-ONE feature may also be used to provide a "snap-shot" of the selected data segment in case the contents of the segment change too rapidly to allow visual interpretation of the display lamps. In this case, switch S16 is set to a bit that is known to be a logical 1. When the clear switch S13 is depressed the display will show the selected segment the next time it is received and then hold it for examination. Lamp 36 will indicate to the user that the display is frozen and that it will no longer be updated until the clear switch is closed.

Although a presently preferred embodiment of the present invention has been disclosed in detail above, it is to be understood that many alterations and modifications could be made without departing from the essence of the invention. For example, additional counter stages might be added to permit counts higher than 4094; additional shift registers, latches, lamp drivers and lamps could be included to permit monitoring of more than 24 bits of data at a time; the sync detector could be expanded to include more comparator circuits so as to handle synchronization codes longer than 24 bits; and the sync code selection inputs to the comparator circuits could be made switchable to permit quick selection of other synchronization codes. Furthermore, switch S16 could be replaced by individual toggle switches and a multiple input AND gate to permit flexible decoding of the STOP signal, and gate 18 could be replaced by several gates and switches to permit the selection and decoding of a variety of "filler" patterns.

In addition to the advantages previously mentioned, it will be appreciated that the above-disclosed monitor may be made small in size, portable, self-contained and relatively inexpensive. Moreover, its built-in flexibility permits its use with a variety of data transmission systems, transmission rates, data formats and codes, and it may be used as a diagnostic device or as a routine monitoring tool without in any way affecting normal operation of the transmission system.

While the present invention has been particularly shown and described with reference to a certain preferred embodiment, it is intended that the following claims be interpreted covering all alterations and modifications as fall within the true spirit and scope of the invention.

What is claimed is:

1. High speed data monitoring apparatus for connection to a data handling system to monitor a stream of data having a block format including a sequence of synchronizing data bits followed by a sequence of information data bits, and for displaying a selected segment of the data following said synchronizing data bits, comprising:

shift register means for receiving the stream of data and for developing a plurality of register contents signals corresponding respectively with the data states of the various data bits contained within said register means at any time;

means coupled to said shift register means for receiving clock pulses from said data handling system, said clock pulses controlling the contents signal shift rate in said shift register means;

synchronization detector means coupled to said shift register means for detecting a predetermined sequence of synchronization data bits in said shift register means and generating a synchronization detection signal when said sequence is detected;

means coupled to said receiving means for counting clock pulses input to said shift register means after said synchronization detection signal has been generated and for generating a count complete signal when a preselected number of clock pulses have been input to said shift register means;

data storage means coupled to said shift register means for storing the contents signals existing at the time said count complete signal is generated; and display means coupled to said data storage means for displaying the said existing contents signals stored in said storage means.

2. High speed data monitoring apparatus as recited in claim 1 wherein said counting means includes means for enabling the selection of said preselected number from a range of numbers, the selected segment of data to be displayed being determined by the particular number selected.

3. High speed data monitoring apparatus as recited in claim 1 wherein said synchronization detector means includes comparator means having a first set of inputs for receiving a preselected synchronization code, and a second set of inputs for receiving said contents signals, whereby coincidence between the signals input to said first and second inputs cause said comparator means to generate said synchronization detection signal.

4. High speed data monitoring apparatus as recited in claim 3 wherein said synchronization detector means further includes means coupled to said first set of inputs for enabling the selection of a particular synchronization code corresponding to that of the data block to be monitored.

5. High speed data monitoring apparatus as recited in claim 1 and further comprising pulse generator means responsive to said count complete signal and operative to generate a load signal; and wherein said storage means includes electronic latch means responsive to said load signal and operative to receive and store said existing contents signals.

6. High speed data monitoring apparatus as recited in claim 5 wherein said display means includes a plurality of indicators each capable of indicating the data state of one of said existing contents signals, and driver means coupled to said latch means for actuating said indicators in accordance with said existing contents signals.

7. High speed data monitoring apparatus as recited in claim 6 and further comprising an alarm, a bit detector and a bit selector, said bit selector being coupled between said data storage means and said bit detector, said bit detector being coupled between said bit selector and said alarm, said bit selector enabling a selected one of said existing contents signals to be monitored by said bit detector, and said bit detector causing said alarm to be actuated if the selected contents signal is of a particular preselected data state.

8. High speed monitoring apparatus as recited in claim 1 wherein said counting means includes gate means coupled to said receiving means for controlling the input of said clock pulses.

9. High speed data monitoring apparatus as recited in claim 8 and further comprising a flip-flop coupled to said gate means and having a set input for receiving said synchronization detection signal and in response thereto causing said gate means to enable said clock pulses to be counted, said flip-flop further having a reset input for receiving said count complete signal and in response thereto causing said gate means to prevent said clock signals from being counted.

10. High speed data monitoring apparatus as recited in claim 1 and further comprising filler data detection means coupled to said data storage means for detecting the presence of filler data among said contents signals and for inhibiting actuation of said storage means when such filler data is detected.

* * * * *